United States Patent Office 3,118,951
Patented Jan. 21, 1964

3,118,951
PREPARATION OF BIS-PHOSPHINES
Anton B. Burg and Louis R. Grant, Los Angeles, Calif., assignors, by mesne assignments, to American Potash & Chemical Corporation, a corporation of Delaware
No Drawing. Filed July 8, 1959, Ser. No. 825,659
22 Claims. (Cl. 260—606.5)

This invention relates in general to the preparation of phosphines which contain more than a single phosphorus atom and more particularly to a reaction involving a biphosphine and an alkene or alkyne to produce bis-phosphines.

An object of this invention is to provide a method for the preparation of various primary, secondary and tertiary bis-phosphines.

A further object of this invention is to provide various new chemical compounds.

Other objects and advantages of this invention, if not specifically set forth, will become apparent during the course of the description which follows.

Generally, it is found that certain bis-phosphines, specifically materials containing two phosphorus atoms separated by two carbon atoms, can be prepared by the reaction in the presence of a small amount of an iodine catalyst of a biphosphine, specifically a material of the general formula $R_2P$—$PR_2$, where the R symbols represent the same or different halogen, hydrocarbon or halogenated hydrocarbon groups, and a compound of the general formula $R'_2C$=$CR'_2$ or $R'C$≡$CR'$, where the R' symbols represent the same or different radicals which may be hydrogen, hydrocarbon, halogen, or any combination thereof.

As indicated, the use of an iodine catalyst facilitates the reaction but, as shown in Examples I–IV below, an olefin will react with a biphosphine over an extended period of time even in the absence of the catalyst. However, the use of a catalyst appears to be essential where an acetylenic compound is reacted with a biphosphine.

The reaction involving an alkene may be written as follows:

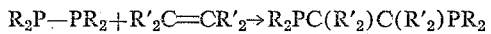

Where an alkyne is reacted, the equation becomes:

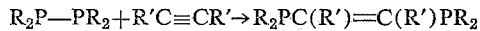

As will be seen from the specific examples set forth below, the reaction is facilitated by electronegative groups on P and by electropositive groups on C.

Using hydrogen as a reference point, the halogens and such groups as cyano and carbonyl approach the electronegative extreme, with such groups as $CF_3$ and $CCl_3$ being approximately as electronegative as the bare halogen. Positioned toward the positive end of the scale are the alkyl groups with rapidly increasing degrees of electropositivity being displayed between $C_1$ and $C_4$, together with a somewhat greater degree of electropositivity where a branched chain structure allows methyl groups to cluster about a central carbon atom. For example, isopropyl is more electropositive than normal propyl.

In Examples I and III set forth below, the R groups bonded to the phosphorus were respectively $CF_3$ and $CH_3$ and these may be regarded as very close to the extremes from the point of view of the electronic effects of the substituent groups. In Examples I and III, R' was hydrogen, while fluorine was substituted therefor in Example II. As $C_2H_4$ and $C_2F_4$ worked satisfactorily, it may be stated that almost any olefin would be satisfactory.

Certain of the compounds produced by this process are primary and secondary bis-phosphines. Various utilities for the primary and secondary bis-phosphines are known. See, for example, U.S. Patent 2,925,440 which describes a method which may be used to form phosphinoborines, in turn having various utilities. Various other utilities for the bis-phosphines are known, but a preferred use is as preignition additives in gasoline.

The symbol R preferably represents alkyl ranging between $CH_3$ and $C_{12}H_{25}$, halo-substituted lower alkyl, including $CF_3$ and $CCl_3$ and various aromatic groups including $C_6H_5$, $CH_3C_6H_4$, $ClC_6H_4$, $BrC_6H_4$ and $NO_2C_6H_4$.
The symbol R' preferably represents H, halogen, alkyl ranging between $CH_3$ and $C_{14}H_{29}$, $C_6H_4$, $ClC_6H_4$, $C_6H_5C_6H_4$, $ClC_6H_4$, $BrC_6H_4$, $NO_2C_6H_4$ and halo-substituted lower alkyl.

Examples of suitable olefins are ethylene, isobutylene, 3-chloropropene, hexene-1, 3-ethylpentene-2, pinene, hexadecene, phenylpropylene, alpha-methylstyrene, omega-chlorostyrene, p-chlorophenylethylene, p-bromophenylethylene, p-nitrophenylethylene, p-tolylethylene, butene-2, 1-isopropenyl-4-phenylbenzene, 1,1-diphenylethylene, 1,2-diphenylethylene, 1-phenyl-1-p-biphenylethylene, 1,1-di-p-biphenylethylene, tetrafluoroethylene and tetrachloroethylene.

Examples of suitable alkynes are acetylene, butyne-2, hexadecyne-2, diphenyl acetylene and 1,1,4,4-tetraphenyl butyne-2.

Preferred biphosphines are biphosphine, tetramethylbiphosphine, tetrakis - trifluoromethyl - biphosphine, tetraphenylbiphosphine, tetrachlorobiphosphine, tetraiodobiphosphine, the hybrid phosphine, bis(trifluoromethyl)dimethylbiphosphine, tetraethylbiphosphine, tetrabutylbiphosphine, tetrachlorohexylbiphosphine and tetrabenzylbiphosphine.

Various examples are set forth below for illustrative purposes, but these are not to be interpreted as imposing limitations on the scope of the invention other than as set forth in the appended claims.

EXAMPLE I.—TETRAKIS-TRIFLUOROMETHYL-BIPHOSPHINE WITH ETHYLENE

The reaction between $P_2(CF_3)_4$ (1.702 mmoles) and $C_2H_4$ (2.366 mmoles) was allowed to run for six days at room temperature, after which 0.795 mmole of $C_2H_4$ and 0.055 mmole of $P_2(CF_3)_4$ were recovered. Thus, 96.8% of the biphosphine was used up; and the 569.6 mg. yield of product $(CF_3)_2PC_2H_4P(CF_3)_2$, represented 94.5% of this. In close agreement, the used-up $C_2H_4$ corresponded to 95.4% of the used-up biphosphine. A trace of liquid, not volatile at room temperature, would account for the missing biphosphine, but was not studied further.

The main liquid product was volatile to the extent of a 1.8 mm. vapor tension at 0° C. Its melting range was —51.4 to —51.3° C. Two molecular weight determinations on the vapor at elevated temperatures gave the values 367 and 364; calcd., 366.0, for $(CF_3)_2PC_2H_4P(CF_3)_2$. The basic hydrolysis of a 177.1 mg. sample (110 hours at 100° C.) gave 90.9% of the total $CF_3$ content as $HCF_3$. The remaining solution showed a positive test for fluoride. Even though the basic hydrolysis was not quite clean, it showed that the compound cannot be a superficially bonded adduct of ethylene to $P_2(CF_3)_4$, for the basic hydrolysis of this biphosphine is known to yield only $3HCF_3$ per mole.

EXAMPLE II.—TETRAKIS-TRIFLUOROETHYL-BIPHOSPHINE WITH TETRAFLUOROETHYLENE $C_2F_4$ was reacted with $P_2(CF_3)_4$ in accordance with the process described in Example I above. There was a limited amount of reaction at 140° C., but the process was relatively slow. At 200° C., the products became complex and difficult to resolve. The process was improved by catalysis with a tiny crystal of iodine which was added to the system. In the presence of the iodine, during 34 hours at 165° C., 2.646 mmoles of $P_2(CF_3)_4$ and 3.334 mmoles of $C_2F_4$ produced a product mixture from which was recovered 0.608 mmole of unreacted $C_2F_4$ and 0.782 mmole of unreacted $P_2(CF_3)_4$ along with 488.4 mg. (1.115 mmoles; 60% of theory based on consumed $P_2(CF_3)_4$) of product, $(CF_3)_2PCF_2CF_2P(CF_3)_2$. The product was a liquid characterized by a melting point of —49.7 to —49.6° C.; vapor pressure 1.91 mm. at 0° C.; and vapor density corresponding to molecular weight values of 438.1 and 440.8 in duplicate determinations (calcd. molecular weight: 438). One of the major by-products of the reaction was the cyclic phosphine $$CF_3PC_4F_8$$

EXAMPLE III.—TETRAMETHYLBIPHOSPHINE WITH ETHYLENE

When $P_2(CH_3)_4$ was heated in a sealed tube with ethylene at 100, 200 and 232° C., there was no reaction, as demonstrated by the unchanged melting point. A little reaction occurred during 20 hours at 292° C., and became more extensive on longer heating at 300° C., finally giving a fairly high yield of a slightly volatile liquid which was mostly the new diphosphine $(CH_3)_2PC_2H_4P(CH_3)_2$. It was considered that iodine might have some catalytic effect, for the C—I bond becomes unstable at temperatures around 200° C., so that useful radicals could be expected to become available. In accord with this idea, a tiny crystal of iodine was used in the second experiment. It apparently had some effect, for ethylene was appreciably absorbed during 118 hours at 208° C. and the reaction progressed as rapidly at 260° C. as without iodine at 300° C. The conditions and results of both experiments are shown in Table A.

In each of these experiments, whenever the bomb-tube was opened for scrutiny of the progress of the reaction, the slightly volatile liquid product (1 mm. vapor tension at room temperature) was isolated by high-vacuum fractional condensation and all other components returned to the tube for further heating. At the end, all volatile components were separated as well as possible and fully investigated.

Table A
ABSORPTION OF ETHYLENE BY $P_2(CH_3)_4$
(Quantities in mmoles)

| Experiment No. | Reactants | | Time (hrs.) | Temp. (°C.) | Recovered Reactants | | Methylphosphines | |
|---|---|---|---|---|---|---|---|---|
| | $P_2(CH_3)_4$ | $C_2H_4$ | | | $P_2(CH_3)_4$ | $C_2H_4$ | $(CH_3)_3P$ | $(CH_3)_2PH$ |
| 1 | 1.125 | 1.423 | 20 | 292 | | 1.06 | | |
| | (remainders) | | 72 | 300 | | 0.77 | | |
| | (remainders) | | 160 | 303 | 0.081 | 0.544 | 0.393 | nil |
| 2 | 4.417 | 7.616 | 118 | 207 | | 6.826 | | |
| | (remainders) | | 145 | 258 | | 2.930 | | |
| | (remainders) | | 120 | 267 | 1.39 | 2.043 | 0.306 | 0.236 |

In the iodine-catalyzed Expt. 2, there was an 0.107 mole final yield of material having the volatility and M.W. of $C_2H_5I$. This gave a rough measure of the amount of iodine used; probably less than 20 mg. The $$(CH_3)_2PC_2H_4P(CH_3)_2$$

yield was 360 mg. (79%).

The yield of $(CH_3)_2PC_2H_4P(CH_3)_2$ from Expt. 1 was 100.0 mg., interpreted as 0.666 mole, representing 64% of the used-up $P_2(CH_3)_4$. This sample was purified as well as possible by distilling off the more volatile impurity until a consistent set of vapor tensions could be obtained, as shown in Table B. Its stability, as well as the absence of a more volatile component, is shown by the agreement of the pressure for 22°, for this was measured last, after cooling from the boiling point of the surrounding water-bath. The data are correlated by the equation $$\log_{10}p_{mm}=6.7232-0.00507+1.75\log_{10}T-2844/T$$

according to which the normal boiling point would be 188° C. and the Trouton constant 21.0 cal./deg. mole. The melting point was —1 to 0° C. The molecular weight was determined at 151° C. and 175 mm.: found, 152.0; theory, 150.1. A 65.5 mg. portion of this sample was used to make the double-borine adduct, absorbing 0.436 mmole of $B_2H_6$ quite smoothly. On the assumption that both phosphorus atoms in the molecular complex hold $BH_3$ groups, this combined ratio would imply M.W.=150.2. The adduct began to sublime in high vacuum at 150° C. It was treated with 0.567 mmole of $(CH_3)_3N$ during 8 hours at 100° C. in the hope of demonstrating that the $BH_3$ groups could be removed; but the absorption of the amine amounted to only one-sixth of what would be required to remove all $BH_3$ from its bonding to phosphorus. The whole mixture now was found to be soluble in acetone on warming, mostly crystallizing out of the 5 ml. solution on cooling to room temperature. The open air did not affect it.

Table B
VAPOR TENSIONS OF $(CH_3)_2PC_2H_4P(CH_3)_2$

| $t$ (° C.) | 22.0 | 27.3 | 33.2 | 44.3 | 55.7 | 66.8 | 77.8 | 85.5 | 94.1 |
|---|---|---|---|---|---|---|---|---|---|
| $p_{mm}$(obsd.) | 0.82 | 1.14 | 1.74 | 3.56 | 6.49 | 11.4 | 19.3 | 27.7 | 41.8 |
| $p_{mm}$ (calc.) | 0.80 | 1.15 | 1.70 | 3.57 | 6.40 | 11.4 | 19.5 | 27.7 | 41.8 |

EXAMPLE IV.—THE HYBRID BIPHOSPHINE WITH ETHYLENE

A mixture of 0.973 mmole of $(CH_3)_2PP(CF_3)_2$ with 3.377 mmoles of $C_2H_4$ reacted to a minor extent during nine days at room temperature, using up 0.225 mmole of $C_2H_4$ and forming a while solid. The recombined mixture was heated for 39 hours at 65° C., forming a brown oil indistinguishable from that which formed from the biphosphine alone at 110° C. The consumption of ethylene now was 0.325 mmole, while the biphosphine was virtually all gone. Some formation of —$C_2H_4$— connected diphosphine may have occurred, but the larger effect appear to be the catalysis of the thermal decomposition of the hybrid biphosphine.

EXAMPLE V.—ACETYLENE ADDITION PRODUCTS OF $P_2(CF_3)_4$

During 39 hours at 93° C., the 1:1 mixture with a trace of iodine used up to 70% of the acetylene. The products definitely identified were $(CF_3)_3P$ and the new $(CF_3)_2PCH=CHP(CF_3)_2$. Minor by-products were presumed to be the new compounds $(CF_3)_2PC_2H_2CF_3$ (barely volatile at —78° C.; M.W. obsd. 263; calcd. 264) and $[(CF_3)_2PC_2H_2]_2PCF_3$ (0.29 mm. at 22.5° C.; M.W. obsd. 481; calcd., 490). There was also a tan-colored oil.

The purified product $(CF_3)_2PCH=CHP(CF_3)_2$ melted at —54° C. Its ultra-violet spectrum showed a maximum at 2295 A. and a corresponding minimum at 2115 A., with respective molar extinction coefficients 3560 and 2600. Its volatility is represented by a vapor tension value of 2.3 mm. at 0° C. It reacted with diborane at room temperature, thus taking on one $BH_3$ group.

It will be seen from the foregoing that a method has been provided for adding the two halves of the molecular $P_2R_4$ to the double bond of an alkene or the triple bond of an alkyne at moderate reaction temperatures. That is, the temperatures are moderate (room temperature) where the R group is relatively electronegative as contrasted with the R' group. Where the electronegativity of the R' group approaches that of the R group, the process is far slower, requiring such high temperatures as to incur competition with the thermal decomposition of the biphosphine.

Of the biphosphine reactants described above, several have been well known for some time, viz., $P_2Cl_4$, $P_2I_4$, $P_2H_4$ and $P_2(C_6H_5)_4$. The preparation of $P_2(CF_3)_4$ is described by Bennett, Emeleus and Haszeldine, J. Chem. Soc. 1953, 1565. The preparation of $P_2(C_2H_5)_4$ is described by Hart and Mann, J. Chem. Soc. 1957, 3939. Issleib and Tzschach in Ber. 92, 704 (1959) make reference to $P_2(C_4H_9)_4$, $P_2(CH_2C_6H_5)_4$ and $P_2(C_6H_{11})_4$.

The preparation of $P_2(CH_3)_4$ is as follows:

Tetramethylbiphosphine $(CH_3)_2PP(CH_3)_2$ was prepared by heating dimethylphosphonium chloride (23.74 mmoles) with dimethylaminodimethylphosphine (see U.S. Patent 2,941,001) (25.66 mmoles) at 95° C. in a 60 ml. tube attached to the high vacuum system. After the first yield of the biphosphine had been isolated, the unused aminophosphine was returned to the reaction tube and again heated at 95° with the residual solid. Repetition of this process several times gave a total of 22.79 mmoles (96.2% of theory) of tetramethylbiphosphine according to the equation:

$(CH_3)_2PH_2Cl + (CH_3)_2PN(CH_3)_2$
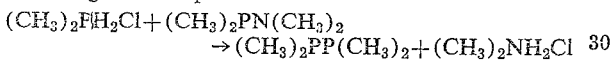
$\rightarrow (CH_3)_2PP(CH_3)_2 + (CH_3)_2NH_2Cl$ The product was characterized by its melting point, −2.25 to −2.15° C.; vapor tension 2.07 mm. at 0° C. and other measurements correlated by the equation:

$\log_{10}P_{mm} = -2444/T + 1.75 \log_{10}T - 0.005588T + 6.5244$ from which the atmospheric boiling point is calculated as 140.2° C.; vapor density corresponding to molecular weight values of 123.3 and 122.8 in duplicate determinations (calcd. molecular weight: 122.09); and by quantitative formation of a methiodide on treatment with methyl iodide at room temperature.

The preparation of $(CH_3)_2PP(CF_3)_2$ is as follows:

1,1-dimethyl-2,2-bis-trifluoromethylbiphosphine,

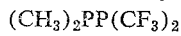
$(CH_3)_2PP(CF_3)_2$ was prepared by mixing 3.540 mmoles of $(CF_3)_2PCl$ (Bennett, Emeleus and Haszeldine, op. cit.) with 3.698 mmoles of dimethylphosphine and 3.728 mmoles of trimethylamine in diethyl ether with stirring at −78° C. The trimethylamine hydrochloride which precipitated was removed by filtration, and the remaining liquid was fractionated, yielding 3.281 mmoles (89% of theory) of product according to the reaction:

$(CH_3)_2PH + (CF_3)_2PCl + (CH_3)_3N$
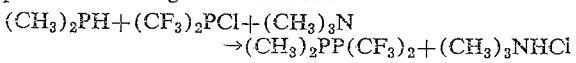
$\rightarrow (CH_3)_2PP(CF_3)_2 + (CH_3)_3NHCl$ The product was characterized by melting point, −79.1° C.; vapor tension 5.3 mm. at 0° C. and other measurements correlated by the equation:

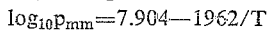
$\log_{10}P_{mm} = 7.904 - 1962/T$ from which the normal boiling point is calculated to be 117° C.

Obviously, many modifications and variations of this invention may be made without departing from the spirit and scope thereof, and therefore only such limitations should be imposed as are indicated in the appended claims.

We claim:

1. A process for the preparation of a bis-phosphine comprising reacting a biphosphine of the general formula $R'''_2P\text{---}PR'''_2$ wherein $R'''$ is a hydrocarbon group with a compound selected from the class consisting of alkenes and alkynes in the presence of an iodine catalyst.

2. A process for the preparation of a bis-phosphine of the general formula $R_2PC(R'_2)C(R'_2)PR_2$ wherein R is selected from the class consisting of lower alkyl, halo- substituted lower alkyl, phenyl, alkyl-substituted phenyl and halo-substituted phenyl, and wherein R' is selected from the class consisting of hydrogen, halogen, lower alkyl, halo-substituted lower alkyl, phenyl, lower alkyl-substituted phenyl, halo-substituted phenyl and biphenyl comprising: reacting a bisphosphine of the general formula $R_2P\text{---}PR_2$ with an alkene of the general formula $R'_2C\text{=}CR'_2$ wherein the symbols R and R' are used as aforestated.

3. The process of claim 2 wherein the R groups are together substantially more electronegative than the groups designated R'.

4. The process of claim 2 wherein a small amount of iodine is used as a catalyst.

5. The process of claim 2 wherein R is $CH_3$.

6. The process of claim 2 wherein R is $CF_3$.

7. The process of claim 2 wherein R' is H.

8. The process of claim 2 wherein R' is Cl.

9. The process of claim 2 wherein R' is F.

10. The process of claim 2 wherein R is $CF_3$ and wherein R' is H.

11. The process of claim 10 wherein the reaction is carried out at about room temperature.

12. The process of claim 2 wherein R is $CH_3$ and wherein R' is H.

13. The process of claim 12 wherein the reaction is carried out at a temperature in excess of about 250° C.

14. A compound of the general formula

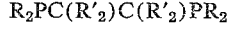
$R_2PC(R'_2)C(R'_2)PR_2$ wherein R is selected from the class consisting of halo-substituted lower alkyl, phenyl, alkyl-substituted phenyl and halo-substituted phenyl and wherein R' is selected from the class consisting of hydrogen, halogen, lower alkyl, halo-substituted lower alkyl, phenyl, lower alkyl-substituted phenyl, halo-substituted phenyl and biphenylyl.

15. The compound $(CF_3)_2PC_2H_4P(CF_3)_2$.

16. The compound $(CF_3)_2PC_2F_4P(CF_3)_2$.

17. A process for the preparation of a bis-phosphine of the general formula $R_2PC(R')\text{=}C(R')PR_2$ wherein R is selected from the class consisting of lower alkyl, halo-substituted lower alkyl, phenyl, alkyl-substituted phenyl, and halo-substituted phenyl and wherein R' is selected from the class consisting of hydrogen, halogen, lower alkyl, halo-substituted lower alkyl, phenyl, lower alkyl-substituted phenyl, halo-substituted phenyl and biphenylyl comprising: reacting in the presence of an iodine catalyst a biphosphine of the general formula $R_2P\text{---}PR_2$ with an alkyne of the general formula $R'C\text{≡}CR'$ wherein the symbols R and R' are used as aforestated.

18. The process of claim 17 wherein the R groups are together substantially more electronegative than the groups designated R'.

19. The process of claim 17 wherein R is $CF_3$.

20. The process of claim 17 wherein R' is H.

21. The compound $(CF_3)_2PCH\text{=}CHP(CF_3)_2$.

22. A process for the preparation of bis-phosphines of the general formula selected from the group consisting of $R_2PC(R'_2)C(R'_2)PR_2$ and $R_2PCR'\text{=}CR'PR_2$ wherein R is selected from the class consisting of lower alkyl, halo-substituted lower alkyl, phenyl, alkyl-substituted phenyl and halo-substituted phenyl and wherein R' is selected from the class consisting of hydrogen, halogen, lower alkyl, halo-substituted lower alkyl, phenyl, lower alkyl-substituted phenyl, halo-substituted phenyl and biphenylyl comprising: reacting a biphosphine of the general formula $R_2P\text{---}PR_2$ with a compound selected from the class consisting of alkenes of the general formula $R'_2C\text{=}CR'_2$ and alkynes of the general formula $R'C\text{≡}CR'$ wherein the symbols R and R' are used as aforestated.

References Cited in the file of this patent

UNITED STATES PATENTS

| 2,642,461 | Morris et al. | June 16, 1953 |
| 2,879,302 | England et al. | Mar. 24, 1959 |